July 23, 1957 — A. DROUIN — 2,800,218
LATERAL BEND CONVEYOR
Filed Sept. 14, 1956
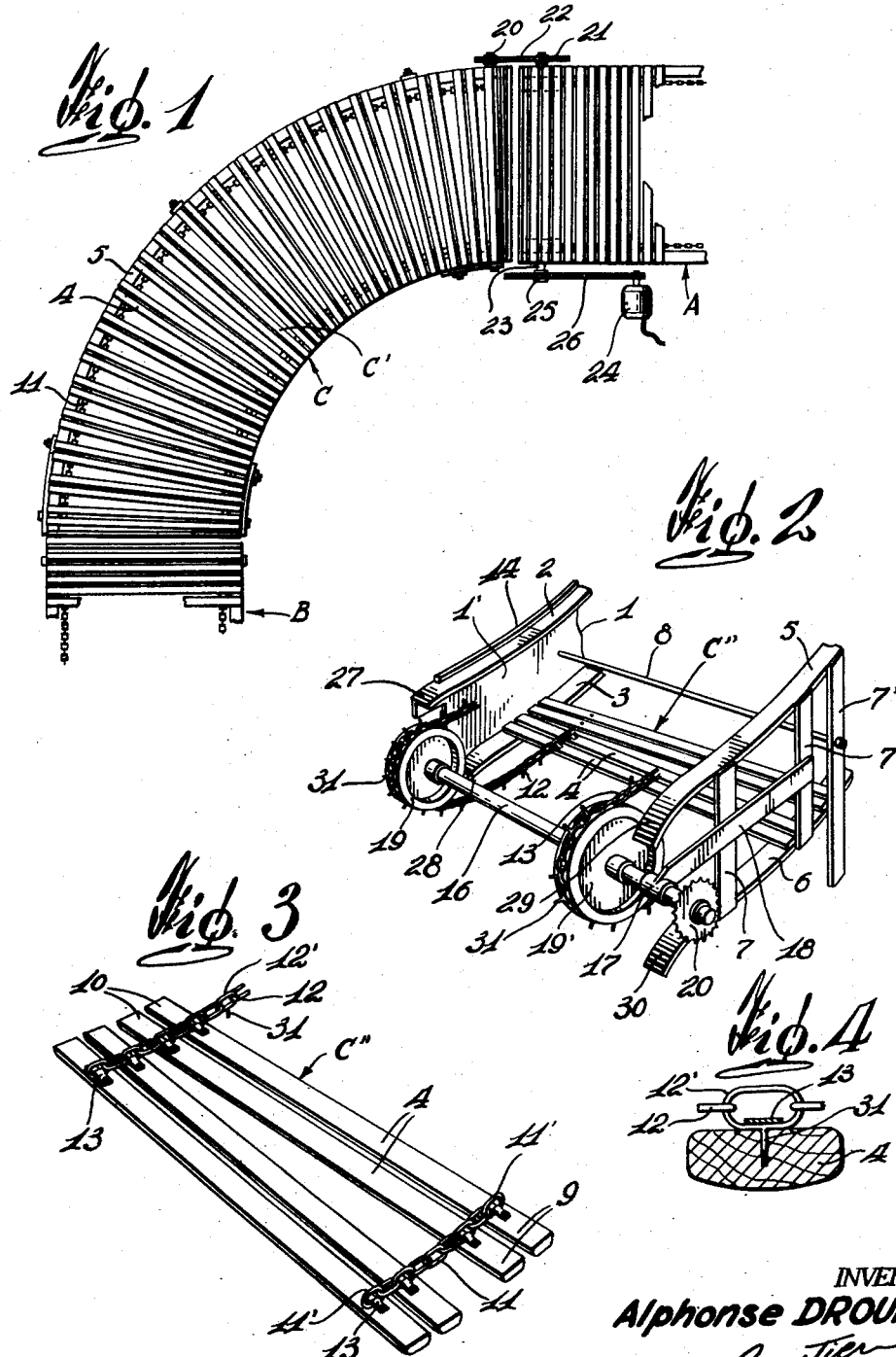
INVENTOR
Alphonse DROUIN
BY
ATTORNEYS

United States Patent Office 2,800,218
Patented July 23, 1957

2,800,218

LATERAL BEND CONVEYOR

Alphonse Drouin, Ste. Agathe, Quebec, Canada

Application September 14, 1956, Serial No. 609,916

1 Claim. (Cl. 198—182)

The present invention relates to conveyors and more particularly to a conveyor provided with a lateral bend so that the direction of the articles moving on said conveyor may be changed up to 180°.

The general object of the present invention is the provision of a lateral bend conveyor more particularly adapted for transporting articles of furniture to various places in a plant and which is constructed in a simple, inexpensive but rugged manner so as to give efficient service without breakage.

Another important object of the present invention is the provision of a conveyor of the character described in which the endless belt is made of slat and chain construction.

The foregoing and other important objects of the present invention will become more apparent during the following disclosure and by referring to the drawings in which:

Figure 1 is a plan top view of the conveyor;

Figure 2 is a partial perspective view of one end of the conveyor, some of the parts being removed for clarity;

Figure 3 is a partial perspective view of the inside face of the conveyor belt; and Figure 4 is a cross-section of a slat at the connection with the chain link.

Referring now more particularly to the drawings in which like reference characters indicate like elements throughout, the letters A and B indicate straight runs of conventional conveyors which are disposed at a 90° angle relative to each other and which are interconnected by the lateral bend conveyor C according to the present invention.

The lateral bend conveyor C comprises a frame work made of a longitudinally curved channel member 1 extending along the inner side of the conveyor. The top and bottom flanges of said channel member form an upper guide rail 2 and a lower guide rail 3 for supporting in a slideable manner the ends of the slats 4 of the endless belt. The upper guide rail 2 is provided with a rib 14 extending along the inner edge of said guide rail 2. The framework of the outer side of the curved conveyor consists of a longitudinally curved upper rail 5 and a longitudinally curved lower rail 6 which are vertically disposed in relation to each other and are radially outwardly spaced from the upper and lower rails 2 and 3 of the inner side of the conveyor. The rails 5 and 6 are rigidly secured to each other by means of uprights 7 disposed at intervals along said rails and which are welded or otherwise rigidly secured thereto. The channel member 1 and the rails 5 and 6 are maintained at a predetermined distance apart along the entire length of the conveyor by means of tie rods 8 which are provided with shoulders engaging the inner face of the web 1' of the channel member 1 and of the uprights 7. Some of the uprights 7 are extended downwardly from the lower rails 3 and 6 to form supporting legs 7' for the conveyor. Such a conveyor could also be suspended instead of being supported by legs 7'.

The endless conveyor belt consists in a plurality of slats 4 which are preferably made of wood and have an elongated rectangular shape; said slats 4 are preferably arranged in pairs; the slats in each pair being parallel to each other and adjacent pairs making a slight angle between each other such that the ends of the pairs of slats at the outer side of the conveyor will be spaced a greater distance than the inner ends of said slats, and such that the extended axis of each pair of slats will pass through the centre of curvature of the conveyor C.

The pairs of slats 4 are interconnected near their outer ends 9 and inner ends 10 by two flexible link chains 11 and 12 which run longitudinally of the conveyor and are individually connected to the slats 4 by brackets 13. A pin 31 is secured to the chain links 11 and 12 which are connected to the slats 4 by the brackets 13. Each pin 31 extends at right angles to the long axis of the associated link 11 or 12 and in the plane of said link, and engages a bore made in the underface of the associated slat 4. Thus the pins 31 maintain the links 11 and 12 at right angles to the slats 4. The active upper run C' of the belt rests on the upper rails 2 and 5 of the framework; more particularly, the inner end portions of the slats 4 are supported by the inner upper rail 2, while the outer ends 9 of the slats 4 are supported by outer upper rail 5. In order to positively guide the upper run C' of the conveyor belt along the 90° bend, the inner ends 10 of the slats abut against the rib 14 of the inner upper rails 2 and are in slidable contact with said rib 14. The lower run C", more particularly shown in Figure 2, rests with the outer face of the slats 4 upon the lower rails 3 and 6; the inner ends 10 of the slats 4 slidably abut against the web 1' of the channel member 1. Thus both the upper run C' and the lower run C" of the conveyor belt are positively guided along the bend of the conveyor.

The conveyor belt consisting of the slats 4 and link chains 11 and 12 is positively driven in the following manner. At one end of the lateral bend conveyor C there is mounted transverse shaft 16 which is journalled in bearings 17 which are rigidly secured to the web 1' and to the ends of bars 18 which are themselves welded to the uprights 7 at the end of the conveyor. Chain engaging wheels or socket rim wheels 19 and 19' are secured to the shaft 16 and have unequal diameters, the wheel 19 at the inner side of the conveyor having a smaller diameter than the wheel 19' of the outer side of the conveyor. These socket rim wheels 19 and 19' are suitably recessed to positively engage the chains 11 and 12 respectively, so as to longitudinally displace the same upon rotation of said wheels. More particularly, the recesses in the wheels 19 and 19' form a first series of sockets which extend at right angles to the face of the wheel rim and which alternate with a second series of sockets which lie in planes parallel to the face of said wheel rim. The links of the chains 11 and 12 smoothly engage the recesses or sockets of the wheels 19 and 19' because they are maintained in the desired position relative to said recesses by the pins 31 described hereinabove. A pinion 20 is secured to the outer end of the shaft 16 and is drivingly connected to a gear wheel 21 by means of a drive chain 22. The gear wheel 21 is secured to the driving shaft 23 of the straight conveyor assembly A, said driving shaft 23 being driven by an electric motor or other suitable power means 24 through the gear 25 and gear chain 26. In order that the conveyor belt consisting of the slats 4 and chains 11 and 12, be transversely horizontal, the shaft 16 is slightly inclined downwardly towards the outer side of the conveyor so as to compensate for the difference of diameters of the wheels 19 and 19'.

In order to provide smooth engagement or disengagement of the slats 4 with or from the rails 2, 3, 5 and 6 at the ends of the conveyor, said rails are downwardly bent as shown at 27, 28, 29 and 30 respectively in Figure 2. The non-driven end of the conveyor C is provided with a shaft 16 and wheels 19 and 19' on which the chains 11 and 12 are trained.

While a preferred embodiment according to the present invention has been illustrated and described it is understood that various modifications may be resorted to without departing from the spirit and scope of the appended claim.

What I claim is:

A conveyor comprising a supporting frame comprising two arcuate upper side rails disposed in radially spaced relation to each other and two arcuate lower side rails disposed in radially spaced relation to each other and respectively vertically below the upper side rails, a horizontally curved endless belt made of a plurality of transverse slats, said slats being disposed in pairs, the slats of each pair being parallel to each other and each adjacent pair making an angle with each other, and two link chains with links of equal size interconnecting said slats near the ends thereof, pins rigidly secured to links of said chains and engaged in bores in said slats in order to maintain said chain links in a predetermined angular position relative to said slats, the ends of the slats of the upper run of said endless belt slidably resting on the upper rails while the ends of the slats of the lower run of said belt slidably rest on said lower rails, brackets for securing said slats to said chains, driving means for said conveyor including two socket rim wheels of unequal diameter into the sockets of which the links of said chains are drivingly engaged, and a rib upstanding from said inner upper rail and a web interconnecting said upper and lower inner rails, the inner ends of the slats of the upper and lower runs of said belt slidably abutting said rib and said web respectively.

References Cited in the file of this patent

UNITED STATES PATENTS

| | | |
|---|---|---|
| 1,207,065 | Miller | Dec. 5, 1916 |
| 2,405,530 | Sullivan | Aug. 6, 1946 |
| 2,633,975 | Koerber | Apr. 7, 1953 |

FOREIGN PATENTS

| | | |
|---|---|---|
| 504,765 | Belgium | Aug. 14, 1951 |